United States Patent
Elwin

(10) Patent No.: US 6,463,128 B1
(45) Date of Patent: Oct. 8, 2002

(54) ADJUSTABLE CODING DETECTION IN A PORTABLE TELEPHONE

(75) Inventor: Randy Elwin, Cardiff by the Sea, CA (US)

(73) Assignee: Denso Corporation, Aichi-Ken (JP)

( * ) Notice: Subject to any disclaimer, the term of this patent is extended or adjusted under 35 U.S.C. 154(b) by 0 days.

(21) Appl. No.: 09/408,141

(22) Filed: Sep. 29, 1999

(51) Int. Cl.[7] .............................................. H04M 11/00
(52) U.S. Cl. .......................................... 379/52; 455/69
(58) Field of Search ........................... 375/52; 381/314, 381/315, 316; 455/69, 70, 550

(56) References Cited

U.S. PATENT DOCUMENTS

| | | | | |
|---|---|---|---|---|
| 6,061,431 A | * | 5/2000 | Knappe et al. | ................ 379/52 |
| 6,108,565 A | * | 8/2000 | Scherzer | ...................... 455/562 |
| 6,212,496 B1 | * | 4/2001 | Campbell et al. | ............. 381/66 |
| 6,263,191 B1 | * | 7/2001 | Proctor | ......................... 455/69 |

* cited by examiner

Primary Examiner—Wing F. Chan
Assistant Examiner—Lun-See Lao
(74) Attorney, Agent, or Firm—Fish & Richardson P.C.

(57) ABSTRACT

A user's individual hearing characteristics are obtained and stored. Those characteristics are sent to the far end cellular telephone. The vocoder in the far end cellular telephone voice-codes the information based on the characteristics.

11 Claims, 1 Drawing Sheet

ADJUSTABLE CODING DETECTION IN A PORTABLE TELEPHONE

BACKGROUND

Portable digital telephones often operate by coding voice using a so called "codec" device or voice coder ("vocoder"). The codec breaks down the voice into digital parameters that indicate the voice. In order to reduce the size of the data, the information is processed in a way that removes the portions of the sound that the user is least likely to hear. The coding is generally done on a statistical basis, as a function of frequency.

The inventor recognized, however, that the average device of this type is based on the characteristics of an average person. Different people hear differently. Hearing depends on age, race, sex and other information. It may also depend on the person's occupation. For example, certain professions can cause more hearing loss than others.

The telephones use a codec to code and decode sound. However, the coding scheme in the codecs is set for an average person.

SUMMARY

The present system describes changing characteristics of the coding carried out by a codec to compensate for a person's individual hearing capabilities. According to the present system, an indication of a person's hearing capabilities are obtained. This indication can include one of a number of presets, or can be a custom determination of a person's actual hearing. The system determines how to adjust the output sound so that the user will be better able to hear it.

A message is sent from the decoding phone to the coding phone telling the far-end codec to alter certain frequencies to put more information in those frequencies. Then, on decompression, the user obtains pre-emphasized signals.

BRIEF DESCRIPTION OF THE DRAWINGS

These and other aspects will now be described in detail with respect to the accompanying drawings, wherein.

DESCRIPTION OF THE PREFERRED EMBODIMENTS

Figure 1:
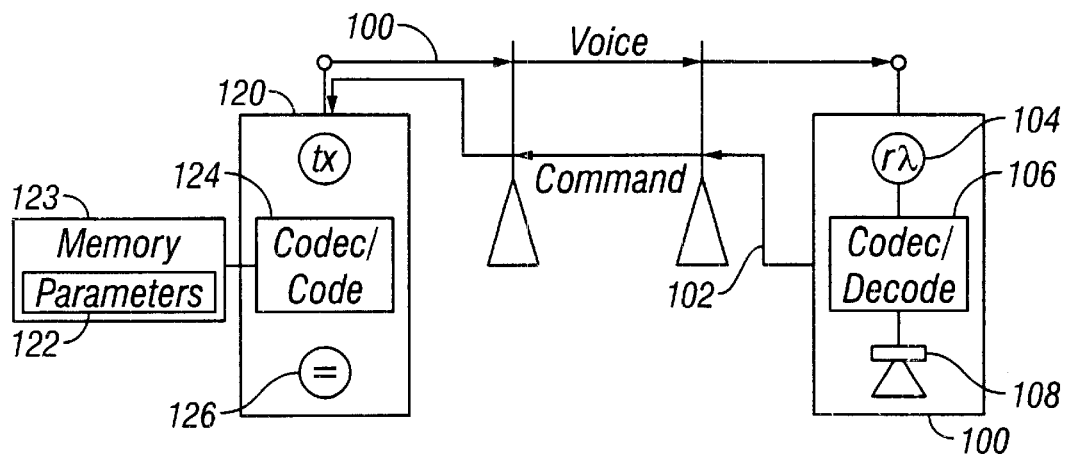
FIG. 1 shows a block diagram of the entire system.

The preferred embodiment is a system which operates according to the general block diagram shown in FIG. 1. The system in FIG. 1 shows the user listening to handset 100 (the near-end phone) that is communicating to handset 120 (the far-end phone). Both of these devices are preferably digital cellular handsets, e.g. using code division multiple access (CDMA), e.g. IS-95. Signal 102 represents a signal sent from the receiving handset 100 to the transmitting handset 120. This signal indicates that the user at handset 100 is requesting an alteration in the coding to adjust to his particular hearing. This signal is received by handset 120, and alters the hearing profile parameters 122 that are stored in memory 123, that is associated with the codec 124. Memory 123 hence stores information indicative of a user's individual hearing profile.

Thereafter, the remote user speaks into the remote phone 120. The voice is coded according to the parameters 122 as modified by the command 102. The coded signal is sent as signal 110 to the local phone 100. The signal is received by receiver 104 which includes the telephone electronics, and decoded at 106 to produce audio output 108. The audio output 108 is inherently compensated, as described above.

The user interface instructs the far end to alter the desired frequencies based on information in the memory 123. A number of common hearing loss scenarios are possible. For example, one common hearing loss scenario includes people who have trouble hearing the high-end portions of sound. For those people, the high end information can be emphasized, and/or more information can be placed into the low-end of the spectrum where to the user can hear better.

Figure 2:
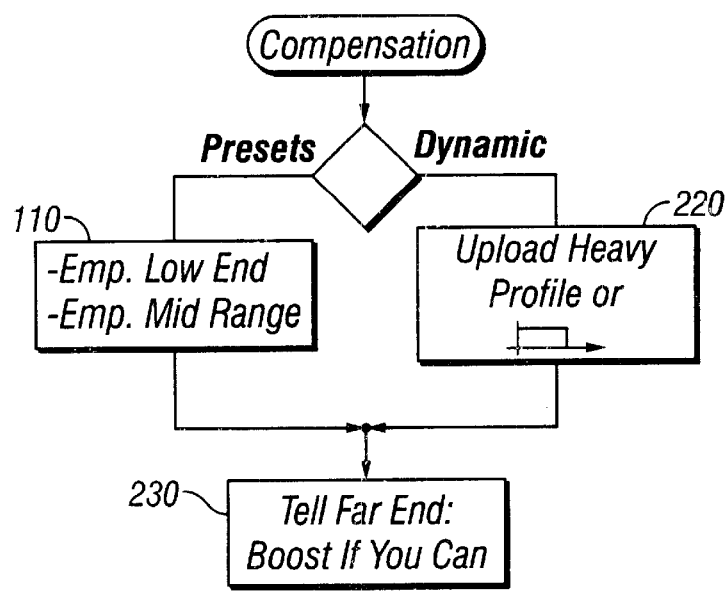
FIG. 2 shows a flowchart of operation.

The device is controllable using either by selecting one of a number of preset hearing profiles, or by dynamically selecting parameters of the profile. The control for commanding the equalization is shown in flowchart form in FIG. 2. The user interface allows selecting from prestored profiles, or "presets" shown on the left, or dynamic control shown on the right. The presets typically emphasize the low end, mid range, or other known hearing deficiencies. While only two presets are shown, it should be understood that many more different kinds of presets could be selected. The interface allows a user to select a preset and test it, and then either keep or discard it. The dynamic control enables the user to upload a hearing profile, or interact with a flat-line frequency response as shown in step 220 in FIG. 2. The frequency response shown in the bottom portion, step 220, can be altered by the user. A menu option on the telephone can be used to change the frequency. For example, a graphic equalizer-type display can be displayed, and changed by the user. Each frequency band can be raised or lowered and tested.

Whichever way of compensation is selected, at step 230, the telephone tells the far end codec to boost certain frequency ranges if it can. The far end codec then reacts to carry out the adjustment. If done correctly, then most of the energy for the transmission is then put in the bands where the user can best hear, for example.

Other modifications are within the disclosed embodiment.

What is claimed:

1. A hearing compensated portable telephone, comprising:
   a memory, storing information indicative of a user's hearing profile;
   a telephone functional part, enabling coded communication with a far-end telephone; and
   a controller part, which requests said far-end telephone to adjust an aspect of its coding, based on said information in said memory.

2. A telephone as in claim 1, wherein said telephone functional part includes a digital voice coder.

3. A telephone as in claim 1, further comprising a user interface, enabling changing said information.

4. A telephone as in claim 3 wherein said user interface operates by allowing selection of a profile from a plurality of prestored profiles.

5. A method of communication comprising:
   obtaining information indicative of a user's hearing profile in a first communicating element;
   communicating information indicative of said hearing profile to a second communicating element; and
   using said information to change voice coding characteristics in said second communication device.

6. A method as in claim 5 wherein said using comprises digitally coding voice by emphasizing certain frequency bands based on said hearing profile.

7. A method as in claim 5 wherein said using comprises adjusting amounts of power for each frequency band based on the user's hearing characteristics in said band.

8. A method as in claim 5 wherein said communicating is via IS-95.

9. A method as in claim 5 wherein said obtaining comprising selecting a prestored hearing profile.

10. A method as in claim 5 wherein said obtaining comprises dynamically adjusting a hearing characteristic.

11. A telephone as in claim 1, wherein said command requests the telephone to emphasize certain frequencies.

* * * * *